April 30, 1963     H. MÜLLER     3,087,535
PORTABLE PROJECTION SCREEN
Filed July 11, 1960     4 Sheets-Sheet 1

INVENTOR.
HERMANN MÜLLER
BY
ATTORNEYS

April 30, 1963   H. MÜLLER   3,087,535
PORTABLE PROJECTION SCREEN
Filed July 11, 1960   4 Sheets-Sheet 2
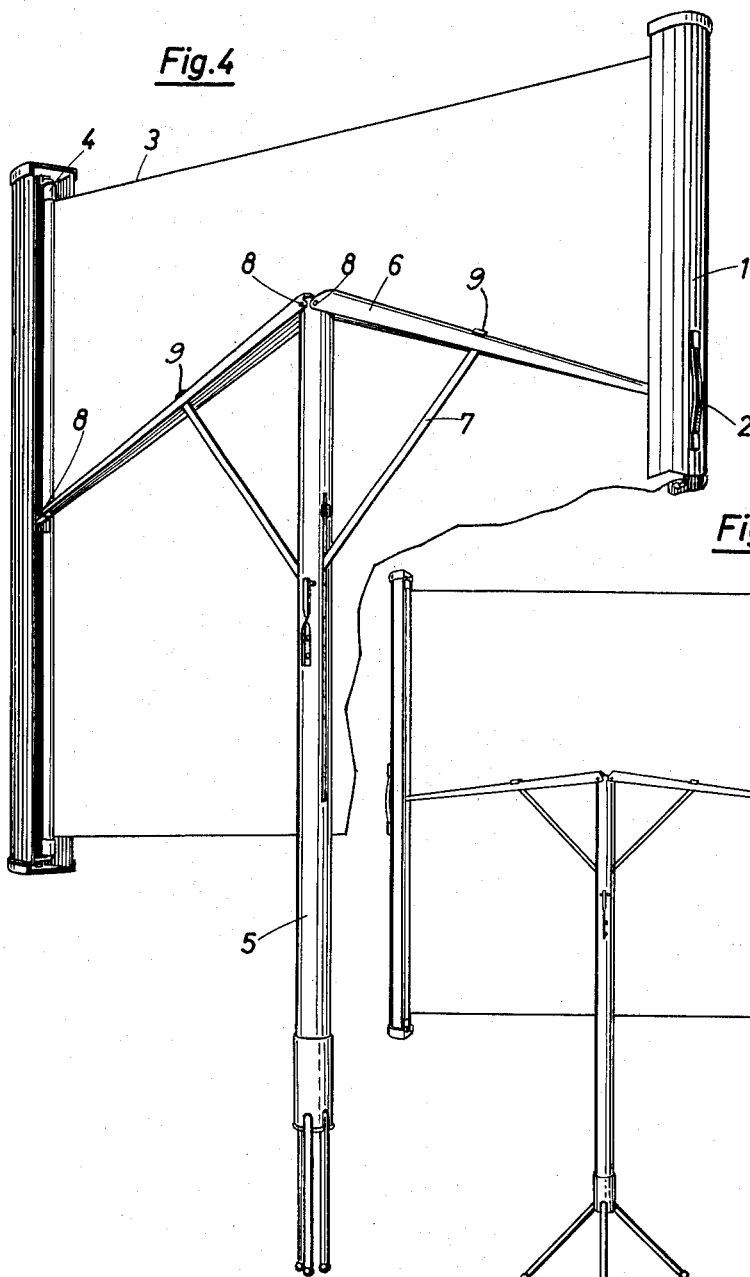
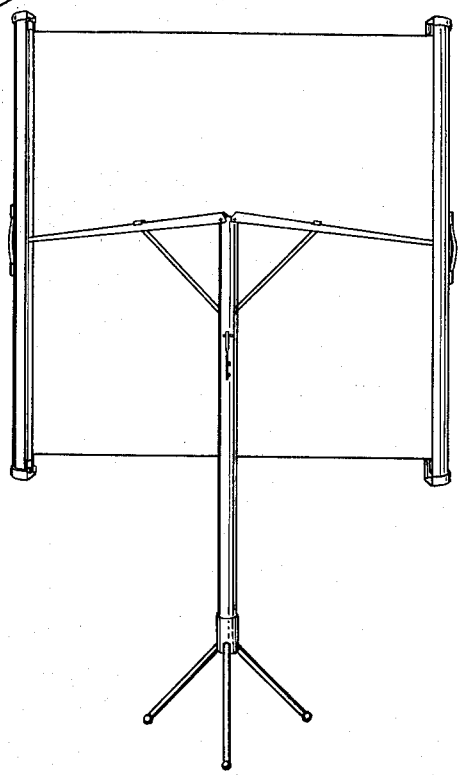
INVENTOR.
HERMANN MÜLLER
BY Connolly and Hutz
ATTORNEYS

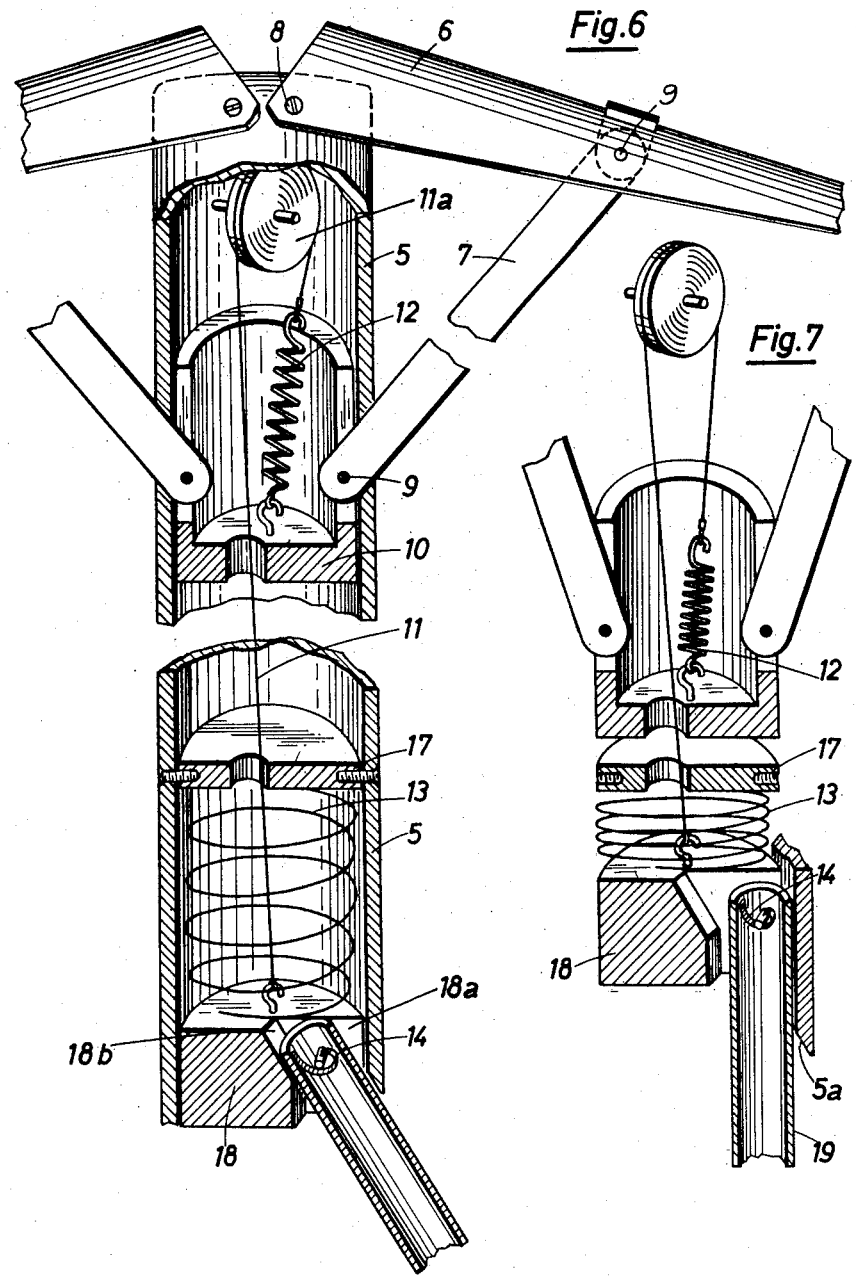

April 30, 1963     H. MÜLLER     3,087,535
PORTABLE PROJECTION SCREEN
Filed July 11, 1960     4 Sheets-Sheet 4

INVENTOR.
HERMANN MÜLLER

United States Patent Office 3,087,535
Patented Apr. 30, 1963

3,087,535
PORTABLE PROJECTION SCREEN
Hermann Müller, Munich, Germany, assignor to Agfa Aktiengesellschaft, Leverkusen-Bayerwerk, Germany, a corporation of Germany
Filed July 11, 1960, Ser. No. 41,948
Claims priority, application Germany July 18, 1959
15 Claims. (Cl. 160—24)

This invention relates to a screen upon which slides and motion pictures and the like are projected, and it more particularly relates to a screen of this type in which a fabric such as canvas is wound upon a roller.

The rollers of existing screens of this type are generally unrolled in a vertical direction, and when they are connected to a stand they must be rotated 90° in folding and unfolding the unit. This requires the performance of a number of operations, some requiring the expenditure of considerable force, in extending and rolling up these screens.

An object of this invention is to provide a portable projection screen which can be extended or collapsed in a single operation with a minimum expenditure of time and effort.

Another object is to provide such a screen in which the rollers need not be rotated relative to the stand in setting up or collapsing.

In accordance with this invention, a pair of rollers which are biased to roll the screen up between them are rotatably mounted upon axes parallel to each other and to a support column which eliminates the necessity to rotate them relative to the stand at any time These rollers may be mounted within the supporting halves of a tubular casing which also encloses the support column when the rollers move close to the column in rolling up which provides a smooth compact outer surface for the collapsed screen which is uninterrupted by any proecting or detachable parts Means are provided for balancing the force of the rollers against the weight of the various parts for minimizing the effort of manipulating the screen throughtout its entire range of movement. Various springs may be utilized for performing auxiliary functions such as the extension and retraction of legs of the stand which may be connected to the aforementioned counterbalancing means to permit extension and retraction of supporting legs to be automatically performed.

Novel features and advantages of the present invention will become apparent to one skilled in the art from a reading of the following description in conjunction with the accompanying drawings wherein similar reference characters refer to similar parts and in which:

FIG. 4 is a perspective view of the projection screen shown in FIG. 2 in a more extended condition;

FIG. 5 is a perspective view of the screen shown in FIG. 4 in a completely extended condition.

FIG. 6 is a front view in elevation partially broken away in cross section of the stand column of the screen shown in FIG. 5;

FIG. 7 is an exploded view in cross section of portions shown in FIG. 6 in an initial stage of collapsing the screen.

Figure 1:
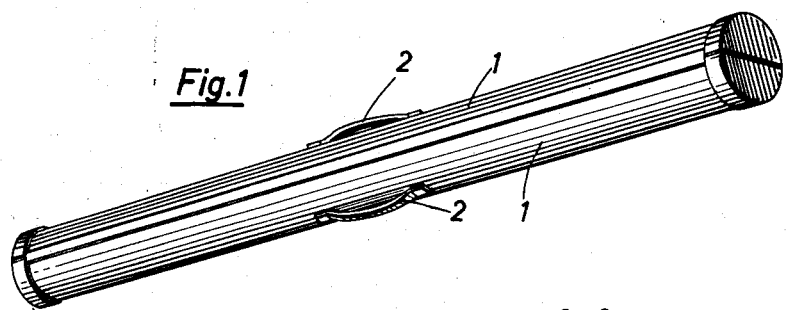
FIG. 1 is a perspective view of one embodiment of this invention in the collapsed condition.
Figure 2:
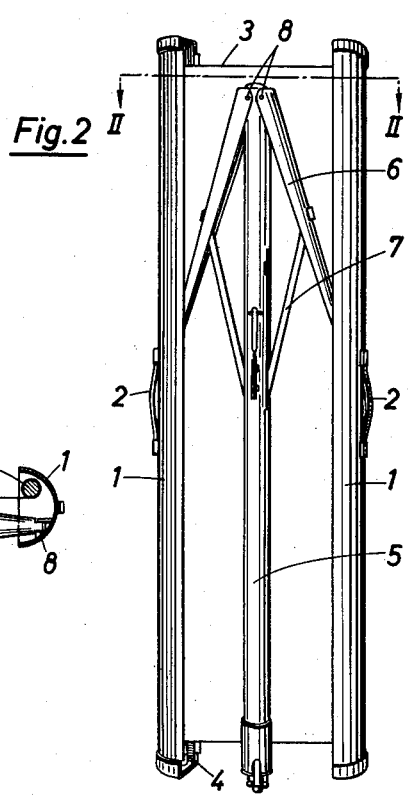
FIG. 2 is a perspective view of the projection screen shown in FIG. 1 in a partially extended condition.
Figure 3:
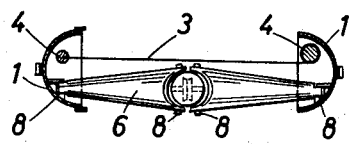
FIG. 3 is a sectional view taken through FIG. 2 along the line II—II.

In FIG. 1 is shown a folded projection screen assembly of elongated cylindrical form. A tubular casing for this screen is formed by two tubular halves 1 having handles 2 attached to opposite surfaces for extending and collapsing it as is later described in detail. As shown in FIG. 2, the screen assembly is stood on end in a vertical position by handles 2 which are then spread apart to unfold screen 3 and to uncover support or stand column 5 which automatically assumes its vertical operating position. FIG. 2 shows the projection screen assembly in an initial extending condition. Springs (not shown) installed in rollers 4 maitain fabric 3 stretched tightly between them and exert a bias upon rollers 4 which tends to roll up screen 3 upon them. Rollers 4 are rotatably mounted within casing halves 1 with their axes disposed parallel to each other and to column 5. Halves 1 are supported upon column 5 by linkage elements including arms 6 and bracing rods 7. The horizontal component of the forces caused by the weight of the elements which extend laterally from stand column 5 is substantially balanced by the force exerted by the roller springs in a horizontal direction and counterbalance means which are later described. This minimizes the force which must be exerted to fold and unfold the screen throughout its entire range of movement. The rotatable joints or pivots between supporting arms 6 and the points of its connection with support or stand column 5 and casing halves 1 are designated by reference numeral 8 as shown in FIG. 3 which is a cross-sectional view taken through FIG. 2. FIG. 4 is a view similar to FIG. 2 in the condition which the screen assumes just before and after its entire extension is attained, and FIG. 5 shows the screen in the extended form in which it is completely unrolled and ready for use.

The cross-sectional view provided by FIG. 6 shows various details of construction. Brace rods 7 are rotatably connected by pivots 9 to arms 6 and to a slider 10 which is mounted to slide up and down within column 5. Slider 10 is also connected to carrier block 18, which also slides up and down within the bottom of column 5, by a coupling means including resilient cable 11 extending over pulley 11a which is rotatably mounted in the top of column 5. The upper ends of legs 19 are rotatably connected to carrier 18 and urged resiliently outwardly through slots in carrier 18 by torsion spring 12 incorporated within it. When the screen is erected as shown in FIG. 6 a retarding means including spring 12 is tensioned enough to maintain the screen rollers unfolded in this condition, but it is not tensioned enough to retract carrier 18 and extended legs 19 within the bottom of column 5 against the forces of the almost fully released compression spring 13 and torsion springs 14. This stably maintains the erected screen in the extended condition.

FIG. 7, which is a cross-sectional view of certain parts in FIG. 6, shows them in the positions that they assume when the process of erecting the screen is commenced. In this position springs 13 and 14 are compressed and tensioned, and compensating tension spring 12 is somewhat relaxed. Spring 13 reacts against plate 17 which is rigidly mounted within the bottom of column 5. When the screen and stand are extended, carrier 18 is pressed downwardly by the force of spring 13 and legs 19 mounted upon carrier 18 are extended outwardly through slots 18a in carrier 18 by torsion springs 14. Legs 19 are supported in the extended condition to form a stand by contact of their inner ends upon inclined surface 18b within slots 18a.

Figure 8:
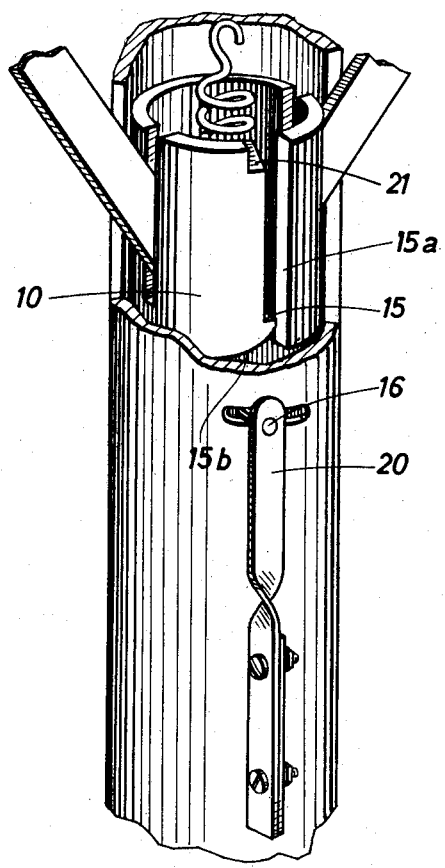
FIG. 8 is a perspective view partially broken away in cross section of some of the portions shown in FIG. 7 in conjunction with a locking device.

Folding of the screen is commenced by exerting a downward pressure in a vertical direction upon handles 2. This places compensating spring 12 under tension and slider 10 is locked by arrestment of its projection 15 upon resilient latch 16 whose end passes along a curved surface 15b in slider 10 past the projection 15 as shown in FIG. 8. This locking action permits the built-up tension in compensating spring 12 together with the horizontal force component provided by the roller springs to prevail over the opposing spring action of compression spring 13 and torsion springs 14. This pulls carrier 18 upwardly within support or stand column 5 to the position shown in FIG. 7 in which legs 19 are retracted and drawn within column 5 by the inwardly directed forces applied to them by the chamfered inner surface 5a at the bottom of column 5 when the weight of the screen is lifted off the legs. This somewhat releases the tension upon compensating spring 12 which allows the force of the roller springs to automatically fold the screen and shifting the slider 10 downward. The upper end of latch 16 slides in groove 15a of slider 10 and thereafter is moved to the left in FIG. 8 into the path of a camming surface 21 on slider 10 by its own resilient forces.

FIG. 8 shows how locking latch 16 is resiliently mounted upon a leaf spring 20 which is twisted 90° to permit it to freely move tangent and radially with respect to column 5. Latch 16, as previously mentioned, reacts with notch 15 and permits compensating spring 20 to be maintained under tension while carrier 18 and legs 19 are retracted. During extension while slider 10 moves upwardly, stop latch 16 is easily diverted away from upper edge of slider 10 by camming surface 21 which is inclined outwardly. This diverts latch 16 radially outwardly and along the smooth side of slider 10 which is thereby permitted to move freely upwardly past latch 16.

What is claimed is:

1. A portable projection screen assembly comprising a vertical column incorporating stand means upon its lower end, a pair of rollers rotatably mounted at their ends on a pair of elongated support means, said pair of support means having their axes disposed parallel to each other and to said column, a screen wound upon and between said rollers, said rollers being biased to roll said screen up upon movement together, linking means connecting said support means to said column for movement toward and away from said column in a manner which maintains said parallel disposition of said rollers throughout the range of movement of said rollers from unrolled positions displaced from each other to a rolled up condition in which they are disposed adjacent said column, said linking means including supporting arms, pivot means connecting the ends of said arms to said column and to said support means, bracing rods extending between said column and said arms for supporting said arms throughout their various phases of movement, another pivot means connecting said bracing rods to said arms, still another pivot means connecting said bracing rods to said column, one of said pivot means connecting said supporting arms and said bracing rods to said column being connected to a slider which is engaged in sliding relationship with said column, said stand means being movable between folded and extended positions relative to said column, and coupling means operatively connecting said slider with said stand means for facilitating the simultaneous movement of said support means toward said column and movement of said stand means to said folded position relative to said column.

2. A projection screen assembly as set forth in claim 1 wherein said rollers are separately mounted in two halves of a tubular casing, and said tubular casing being large enough to enclose said screen and said column in said rolled up condition.

3. A projection screen assembly as set forth in claim 1 wherein counterbalance means provided by said connection of said slider to said stand are connected to said supporting arms and to said bracing rods for maintaining the forces between said biased roller rods and the weight of the elements which extend laterally from said column balanced throughout all phases of movement of said screen.

4. A projection screen assembly as set forth in claim 1 wherein said stand means includes legs mounted upon a carrier, said carrier being inserted to slide up and down within said column, said legs being resiliently biased to extend outwardly when said carrier is disposed at a position adjacent the bottom of said column, and said coupling means including a resilient connection between said slider and said carrier for retracting said carrier and legs within said column when said arms move said slider towards said carrier.

5. A projection screen assembly comprising a vertical column, a stand mounted at the bottom of said column, a screen, the ends of said screen being attached to a pair of rollers, a pair of roller supports, said rollers being mounted upon said supports, linking elements movably attaching said supports to said column in a manner which disposes said rollers parallel to each other and to said column and permits movement of said rollers from a position adjacent said column to one remote from said column, a biasing means reacting between said rollers and said supports in a direction to move them towards each other and adjacent said column, retarding means reacting between said linking elements and said column for balancing the rolling-up force of said screen to maintain said roller supports and screen in an extended condition, said linking elements including supporting arms, pivot means connecting the ends of said arms to said column and to said roller supports, bracing rods extending between said column and said arms for supporting said arms throughout their various phases of movement, another pivot means connecting said bracing rods to said arms, still another pivot means connecting said bracing rods to said column, one of said pivot means connecting said supporting arms and said bracing rods to said column being connected to a slider which is mounted upon said column to slide relative to said column, said stand means being movable between retracted and extended positions relative to said column, and coupling means operatively connecting said slider with said stand means for facilitating the simultaneous movement of said support means toward said column and movement of said stand means to said retracted position relative to said column.

6. A projection screen assembly as set forth in claim 5 wherein said supports are formed as two separate halves of a tubular casing, and said tubular casing being large enough to enclose said rollers and said column when said supports are disposed adjacent said column to provide an encased unit in the collapsed condition.

7. A projection screen assembly as set forth in claim 5 wherein said retarding means comprises counterbalance force means which react upon said linking elements in a manner which substantially balances the rolling-up force of said rollers throughout phases of extension of said screen to minimize the manual effort necessary to adjust said screen throughout its range of movement.

8. A projection screen assembly as set forth in claim 7 wherein said counterbalance means comprises a slider mounted to slide up and down within said column and resilient means which react between said slider and said column.

9. A projection screen assembly as set forth in claim 8 wherein said stand comprises a carrier block, mounted to slide within the bottom of said column, folding legs being rotatably mounted upon said carrier block for rotation between extended and folded positions in which they are insertable within the bottom of said column, resilient means reacting between said slider and said carrier block in a direction to urge said block and legs within said column when said screen is being rolled up upon said rollers; and other resilient means which urge said carrier block out of said column and said legs into the extended condition.

10. A projection screen assembly as set forth in claim 9 wherein a pulley is mounted at the top of said column, and a resilient cable connecting said slider to said carrier block over said pulley for permitting the rolling-up force of said rollers and the weight of the laterally-extending elements to retract said carrier block and legs within the bottom of said column when said screen is in a rolled-up condition and the weight of said assembly is lifted from said legs and for permitting said carrier block and legs to extend from said column when said screen is in an extended condition.

11. A projection screen assembly as set forth in claim 10 wherein a compression spring reacts between said carrier block and a portion of said column in a direction to force said carrier block out of the bottom of said column, said legs being rotatably attached to peripheral portions of said carrier block, and torsion springs react between said legs and said block in a direction to extend them when they are not confined within said column.

12. A projection screen assembly as set forth in claim 11 wherein the bottom of said column is chamfered internally for urging said legs within said column when said carrier block is drawn upwardly.

13. A projection screen assembly as set forth in claim 10 wherein said locking means are provided between said column and said slider for holding it in a position disposed adjacent said carrier block which tensions said resilient cable enough to draw said carrier block and legs within the bottom of said column when the weight of said assembly is removed from said stand.

14. A projection screen assembly as set forth in claim 13 wherein said locking means comprises a notched slot at the bottom of said slider and a resilient latch mounted upon said column.

15. A projection screen assembly as set forth in claim 14 wherein said resilient latch is biased towards the notched side of said slot, and a camming surface is provided in the top of said slider adjacent the notched side of said slot and laterally displaced from it for guiding said latch onto the smooth side of said slider when said slider moves upwardly past said latch while said screen is being extended.

References Cited in the file of this patent

UNITED STATES PATENTS

| | | |
|---|---|---|
| 354,450 | Tripp | Dec. 14, 1886 |
| 385,813 | Langworthy | July 10, 1888 |
| 1,199,258 | Ford | Sept. 26, 1916 |
| 1,830,364 | Knudson | Nov. 3, 1931 |
| 1,904,731 | Harris | Apr. 18, 1933 |
| 2,262,216 | Vunovich | Nov. 11, 1941 |